United States Patent [19]
Teranishi et al.

[11] Patent Number: 5,856,251
[45] Date of Patent: Jan. 5, 1999

[54] CASTABLE REFRACTORY FOR SLIDE GATE

[75] Inventors: Hisahiro Teranishi, Anjyou; Isao Imai; Toshihiro Indou, both of Nagoya, all of Japan

[73] Assignee: Toshiba Ceramics Co., Ltd., Tokyo, Japan

[21] Appl. No.: 871,666

[22] Filed: Jun. 9, 1997

[51] Int. Cl.⁶ .......................... C04B 35/10; C04B 35/66
[52] U.S. Cl. ........................... 501/89; 501/87; 501/90; 501/91; 501/93; 501/100; 501/101; 501/109; 501/118; 501/122; 501/128; 501/119
[58] Field of Search .................. 501/87, 89, 90, 501/91, 93, 100, 101, 109, 118, 119, 122, 128

[56] References Cited

U.S. PATENT DOCUMENTS

| | | | |
|---|---|---|---|
| 4,751,204 | 6/1988 | Kyoden et al. | 501/94 |
| 5,214,006 | 5/1993 | Langenohl | 501/89 |
| 5,246,897 | 9/1993 | Ono et al. | 501/101 |
| 5,494,267 | 2/1996 | Anderson et al. | 501/103 |

OTHER PUBLICATIONS

Patent Abstracts of Japan, "Refractory Plate Material for Sliding Nozzle", publication No. 58–188559, Nov. 1983.
Patent Abstracts, "Sliding Nozzle Plate", publication No. 1–48661, Feb. 1989.
Patent Abstracts of Japan, "Castable Refractory", publication No. 4–139072 May 13, 1992.
Patent Abstracts of Japan, "Castable Refractory Composition", publication No. 3–279269 Dec. 10, 1991.

*Primary Examiner*—Michael Marcheschi
*Attorney, Agent, or Firm*—Foley & Lardner

[57] ABSTRACT

Castable refractory for a slide gate plate is mainly formed of alumina raw material and amorphous carbon raw material of 2 to 15 wt %, and contains silicon carbide and/or boron carbide, the total content thereof being equal to 0.5 to 10 wt % (the content of boron carbide is equal to or less than 3 wt %, and when the content of boron carbide is less than 0.5 wt %, silicon carbide is set to 3 wt % or more), 2 to 10 wt % magnesia of 1 mm or less in particle size, 0.2 to 3 wt % silica fine powder of 5 micrometers or less in particle size, and 0.1 to 5 wt % salt of condensate of formalin and aromatic sulfonate.

4 Claims, No Drawings

CASTABLE REFRACTORY FOR SLIDE GATE

BACKGROUND OF THE INVENTION

1. Field of the Invention

The present invention relates to castable refractory for a slide gate plate which is used for a molten steel container, such as ladle, a tundish or the like, and has high resistance to corrosion and spalling and excellent structure stability before heated.

2. Description of Related Art

In a conventional a molten-metal accommodating vessel such a ladle, a tundish or the like, a slide gate device is disposed at a steel outlet port which is formed on the bottom portion of the molten-metal accommodating vessel, and castable refractory has been known as being used as plate refractory for the slide gate device. However, the castable refractory itself can hardly keep sufficient corrosion resistance and abrasion resistance to molten steel. Therefore, as disclosed in Japanese Laid-open Patent Application No. Sho-58-188559 or No. Sho-64-48661, brick which is excellent in corrosion resistance and abrasion resistance is used as a core member for the core portion of the vessel which is directly brought into contact with the molten steel and the castable refractory is used as an outer-periphery member for holding the brick.

As described above, the conventional castable refractory for a slide gate plate has been used to surround the core member which is directly brought into contact with the molten steel because it is inferior to brick in corrosion resistance, spalling resistance and abrasion resistance. Therefore, it has been hitherto difficult to use the castable refractory as a core member. However, if it is possible to use a slide gate plate formed of only castable refractory as a core member to be brought into contact with molten steel metal without using brick, it is apparent that the manufacturing cost could be lowered. Accordingly, it has been required to develop novel castable refractory which has high resistance to corrosion and spalling and high temperature strength (i.e., high resistance to abrasion).

SUMMARY OF THE INVENTION

The present invention has been implemented to satisfy the above requirement, and it has an object to provide castable refractory which can provide a more economical slide gate plate as compared with a conventional slide gate plate having a dual structure using brick as a core member by achieving a slide gate plate which is formed of castable refractory alone.

In order to attain the above object, castable refractory for a slide gate plate according to the present invention is mainly formed of alumina material and amorphous carbon material of 2 to 15 wt %, and contains silicon carbide and/or boron carbide (the total amount is equal to 0.5 to 10 wt % (however, the amount of boron carbide is equal to or less than 3 wt %, and when the amount of boron carbide is less than 0.5 wt %, silicon carbide is set to be equal to or more than 3 wt %), 2 to 10 wt % of magnesia of 1 mm or less in particle size, 0.2 to 3 wt % of silica fine powder of 5 micrometer or less in particle size, and 0.1 to 5 wt % of salt of condensate of formalin and aromatic sulfonate (in this case, the silica fine powder and the salt of condensate of formalin and aromatic sulfonate are added after the other materials are mixed with one another at a total amount of 100 wt %).

Carbon black is preferably used as the amorphous carbon material. Further, sintered magnesia or electro-fused magnesia is preferably used as the magnesia material.

DETAILED DESCRIPTION OF THE INVENTION

Preferred embodiments according to the present invention will be described.

The castable refractory according to the present invention is mainly formed of alumina raw material and amorphous carbon raw material, and contains at least one kind of silicon carbide and boron carbide, magnesia, silica fine powder and salt of condensate of formalin and aromatic sulfonate. With this composition, the castable refractory of the present invention has high resistance to corrosion, high resistance to spalling and high temperature strength (high resistance to abrasion).

Further, according to the present invention, there can be obtained a slide gate plate which is formed of castable refractory alone without using brick as a core member which will be directly brought into contact with molten metal.

The present invention is not limited to the alumina raw material. However, natural raw material such as bauxite has little crystal stability, and thus it is preferable to use sintered alumina or electro-fused alumina.

With respect to magnesia, preferably, the particle size of magnesia is set to 1 mm or less, and the content of magnesia is set to 2 to 10 wt %.

As the particle size of magnesia is finer, its reactivity with alumina raw material is more enhanced and the magnesia is more greatly promoted to have a spinel structure. The spinel structure causes the castable refractory to be closely packed (high density), so that the castable refractory has higher mechanical strength at high temperature. However, as the particle size is finer, there more frequently occurs cracks due to a slaking between the magnesia and water. Therefore, silica fine powder and salt of condensate of formalin and aromatic sulfonate as described below is needed in order to prevent the slaking as described above.

If the particle size of the magnesia exceeds 1 mm, the slaking occurs little. However, since magnesia has a high coefficient of thermal expansion, heating to the magnesia causes occurrence of voids at the boundary between magnesia particles and a matrix surrounding the particles. Therefore, the structure is gradually weakened and thus long life is not expected. Accordingly, the particle size of magnesia is preferably set to 1 mm or less.

If the content of magnesia is less than 2 wt %, the closely-packed structure of the castable refractory due to the spinel structure is insufficient, and thus the long life is not expectable.

On the other hand, if the content of magnesia is exceeds 10 wt %, the magnesia content is excessively larger as compared with the generation amount of spinel, and the structure is slacked due to residual magnesia after heated. Therefore, the long life is not expectable. Accordingly, the content of magnesia is preferably set to 2 to 10 wt %.

Further, sintered magnesia or electro-fused magnesia is preferably used as magnesia from the viewpoint of stability of product quality.

The carbon raw material is indispensable to enhance resistance to spalling, and amorphous carbon containing little volatile component such as carbon black or the like is used as the carbon raw material.

When carbon materials other than amorphous carbon are used, for example, in the case of crystalline graphite or earthy graphite which is used for MgO—C brick, these materials are low dispersibility and thus a large amount of water is needed. As a result, a workpiece is designed to have high porosity and the long life is not expectable.

Further, even in the case of amorphous carbon, if it is formed of carbon having a large amount of volatile component such as pitch or the like which has not been subjected to heat treatment, the gas pressure of the volatile component of the pitch in closed voids is increased at an initial stage of use, and the workpiece may suffer cracks. Therefore, such carbon is unfavorable.

As described above, when low volatile amorphous carbon such as carbon black or the like is used, the content of water contained in the castable refractory is low because the dispersibility of the amorphous carbon is extremely high, and thus closely-packed workpiece can be obtained. Further, there is no possibility that any cracks occur at the initial stage of use because of the low volatile component.

The low-volatile amorphous carbon such as carbon black or the like has excellent dispersibility in water system, however, its dispersibility is not necessarily sufficient. Therefore, as described later, the dispersibility is more enhanced by adding salt of condensate of formalin and aromatic sulfonate or the like.

Further, when the mixing ratio of the amorphous carbon raw material is less than 2 wt %, a slug infiltration preventing effect is substantially lost, and the enhancement of the useful service life is not expectable.

On the other hand, when the mixing ratio of the amorphous carbon raw material exceeds 15 wt %, the amount of the working water is greatly increased, and the castable refractory has a high porosity, so that the long life is not expectable as in the case where the mixing ratio is less than 2 wt %. Accordingly, the carbon raw material is preferably contained in the range of 2 to 15 wt %.

The silica fine powder is indispensable not only to contribute to the enhancement in mechanical strength after heated, but also to serve as hydration suppressing agent of magnesia, that is, digestion preventing agent. The hydration suppressing mechanism is not clear, but it is estimated that the selective reaction between magnesia raw material and silica flour due to pozzolanic reaction suppresses the hydration of the magnesia raw material.

In order to attain the slaking reaction preventing effect of magnesia, it is better as the particle size of the silica fine powder is smaller. If the particle size of the silica fine powder exceeds 5 μm, no slaking reaction preventing effect of magnesia is obtained, and cracks are liable to occur when it is dried.

Likewise, if the content of the silica fine powder is less than 0.2 wt %, the hydration suppressing effect is insufficient, and cracks may occur when it is dried. On the other hand, if the content of the silica fine powder exceeds 3 wt %, the amount of vitrified components in the structure is increased to reduce the resistance to abrasion, so that the long life is not expectable. Accordingly, the content of the silica fine powder is preferably set to 0.2 wt % to 3 wt %, and the particle size of the silica fine powder is preferably set to 5 micrometers or less.

The salt of condensate of formalin and aromatic sulfonate enhances the hydration suppressing effect of magnesia as in the case of the silica fine powder, and at the same time remarkably enhances the dispersive effect on the carbon raw material in water system as described above, so that the content of contained water can be greatly reduced.

If the content of the condensate salt of formalin and aromatic sulfonate is less than 0.1 wt %, the effect thereof is insufficient, so that the water content is increased and cracks after dried are liable to occur due to the digestion reaction of magnesia.

On the other hand, if the content exceeds 5 wt&%, the workpiece is designed to have high porosity due to a strong foaming action of the condensate salt of formalin and aromatic sulfonate, and thus the long life is not expectable. Accordingly, the content of the condensate salt of formalin and aromatic sulfonate is preferably set to 0.1 to 5 wt %.

The silica fine powder and the condensate salt of formalin and aromatic sulfonate are used as trace constituents for adjusting the dispersibility, so that each of these materials is added at a suitable amount after the other materials are blended with one another at a total amount of 100 wt %.

The silicon carbide or boron carbide acts as antioxidant for the carbon raw material. When antioxidant other than silicon carbide and boron carbide is used, for example, when metal aluminum or metal silicon which is used for MgO—C brick is used, hydrogen gas occurs due to hydration reaction, and cracks may occur in the workpiece. On the other hand, when silicon carbide and/or boron carbide is used, no hydrogen gas occurs, and thus closely-packed workpiece can be obtained.

With respect to silicon carbide, the content of silicon carbide is preferably less than 10 wt %. If the content of silicon carbide exceeds 10 wt %, a large amount of components of low melting point (containing mainly $SiO_2$) are generated, resulting in deterioration of the resistance to corrosion.

With respect to boron carbide, the content of boron carbide is preferably less than 3 wt %. If the content of boron carbide exceeds 3 wt %, a large amount of components of low melting point (containing mainly $B_2O_3$) are generated, resulting in deterioration of the resistance o corrosion.

At least one of silicon carbide and boron carbide may be contained. When no silicon carbide is contained, it is preferable to contain boron carbide of 0.5 wt % or more. Conversely, when no boron carbide is contained, it is preferable to contain silicon carbide of 3 wt % or more. If the content of each of silicon carbide and boron carbide is less than the above value, the antioxidation is insufficient, and the high useful service life is not expectable.

Further, when both silicon carbide and boron carbide are contained, the total amount is preferably set to 0.5 to 10 wt %. In such the case the content of boron carbide is not more than 3 wt %. And when the content of boron carbide is less than 0.5 wt %, the content of silicon carbide is preferably set to 3 wt % or more.

[Embodiments]

Embodiments of the present invention will be described hereunder.

Samples No. 1 to No.4 are shown in table 1 as first to third embodiments, and samples No.1 to No. 17 are shown in tables 2 and 3 as comparative examples.

Tables 1 to 3 show the mixing ratio of raw materials of each sample by wt %. Each of the samples which were formed at the respective mixing ratios shown in the tables 1 and 2 was casted in a mold of 40×40×160 mm, and kept (grown) at 20° C. for 24 hours. Thereafter, the sample was picked up from the mold and dried at 110° C. for 12 hours to obtain castable refractory.

The bulk density (specific gravity), apparent porosity and crushing strength (bending strength) of the castable refractory after dried at 110° C., and the bulk density (specific gravity) apparent porosity and crushing strength (bending strength) of the castable refractory after burned at 1500° C.

for 3 hours were measured, and a corrosion test and a spalling test using an induction furnace were performed.

The corrosion test using the induction furnace was performed by an induction furnace dip method, and the molten steel temperature was set to 1600° C. and the dip time was set to 30 minutes. the melt loss amount of each of the samples (embodiments No. 1 to No.3 and the comparative examples No.1 to no. 17) was measured, and the measured values of these samples were plotted exponentially with the value of the embodiment No. 1 being set as 100. The melt damage test result is shown in tables 4 and 6.

Further, the method for the spalling test was performed by the induction furnace dip method and a water cooling method. The molten steel temperature was set to 1600° C., the dip time was set to one minute, and the water cooling time was set to 30 seconds.

Further, each of the samples (embodiments No. 1 to No.3 and the comparative examples No. 1 to No.17) was cut after the water cooling treatment, and then the incidence of cracks was compared among these samples. The spalling resistance test result is shown in tables 4 to 6. In the tables 4 to 6, circle represents that no crack appeared, triangle represents that small cracks appeared, and X represents that large cracks appeared.

As is apparent from the tables 4 to 6, the castable refractory are more excellent in corrosion resistance, spalling resistance and hot temperature strength (abrasion resistance) than the comparative examples. In a comparison test between the embodiments Nos.1 to 4 and conventional products using brick as a core member by actually using tundish slide gate plates, it was confirmed that the useful service life of the present invention is slightly inferior to the conventional products, however, the tundish slide gates of the present invention can be sufficiently practically used. In the embodiments as described above, hydraulic alumina may be added to enhance the mechanical strength of castable refractory.

As is apparent from the foregoing description, according to the castable refractory for a slide gate plate of the present invention, there can be provided refractory for a slide gate plate which is more excellent in corrosion resistance, spalling resistance and abrasion resistance as compared with conventional castable refractory. Accordingly, as compared with a conventional slide gate plate using brick as a core member which is directly brought into contact with molten metal, a slide gate plate which is formed of only castable refractory can be achieved without using brick as a core member, and thus the manufacturing cost can be reduced.

TABLE 1

|  |  | Embodiment | | | |
|---|---|---|---|---|---|
|  |  | No. 1 | No. 2 | No. 3 | No. 4 |
| $Al_2O_3$ clinker |  | 82 | 77 | 66 | 85.5 |
| MgO | 3–1 mm | — | — | — | — |
|  | 200 mesh | 3 | 5 | 8 | 3 |
| carbon black |  | 5 | 7 | 10 | 5 |
| pitch |  | — | — | — | — |
| crystalline graphite |  | — | — | — | — |
| SiC |  | 5 | 5 | 10 | — |
| $B_4C$ |  | 1 | 1 | — | 2.5 |
| metal Al |  | — | — | — | — |
| metal Si |  | — | — | — | — |
| *condensate salt of formalin and aromatic sulfonate |  | 2 | 2 | 3 | 0.5 |
| **silica flour | <5 μm | 0.5 | 0.5 | 1.5 | 0.5 |
|  | >5 μm | — | — | — | — |
| high-alumina cement |  | 4 | 5 | 6 | 4 |
| ***content of added water wt. % |  | 5.0 | 5.2 | 5.6 | 5.0 |

*, , *: These materials are added after the other materials are mixed with one another at a total amount of 100 wt %.

TABLE 2

|  |  | comparative examples | | | | | | | | |
|---|---|---|---|---|---|---|---|---|---|---|
|  |  | No. 1 | No. 2 | No. 3 | No. 4 | No. 5 | No. 6 | No. 7 | No. 8 | No. 9 |
| $Al_2O_3$ clinker |  | 80 | 84 | 74 | 82 | 82 | 67 | 86 | 82 | 82 |
| MgO | 3–1 mm | 5 | — | — | — | — | — | — | — | — |
|  | 200 mesh | — | 1 | 11 | 3 | 3 | 3 | 3 | 3 | 3 |
| carbon black |  | 5 | 5 | 5 | — | — | 18 | 1 | 5 | 5 |
| pitch |  | — | — | — | — | 5 | — | — | — | — |
| crystalline graphite |  | — | — | — | 5 | — | — | — | — | — |
| SiC |  | 5 | 5 | 5 | 5 | 5 | 5 | 5 | 5 | 5 |
| $B_4C$ |  | 1 | 1 | 1 | 1 | 1 | 1 | 1 | 1 | 1 |
| metal Al |  | — | — | — | — | — | — | — | — | — |
| metal Si |  | — | — | — | — | — | — | — | — | — |
| condensate salt of formalin and aromatic sulfonate* |  | 2 | 2 | 2 | 2 | 2 | 4 | 0.5 | 2 | 2 |
| **silica flour | <5 μm | 0.5 | 0.5 | 0.5 | 0.5 | 0.5 | 0.5 | 0.5 | — | 0.1 |
|  | >5 μm | — | — | — | — | — | — | — | 0.5 | — |
| high-alumina content |  | 4 | 4 | 4 | 4 | 4 | 6 | 4 | 4 | 4 |
| ***content of added water wt. % |  | 5.0 | 5.0 | 5.0 | 18.0 | 6.0 | 8.4 | 4.8 | 5.0 | 6.0 |

*, , *: These materials are added after the other materials are mixed with one another at a total amount of 100 wt. %.

TABLE 3

|  |  | comparative example | | | | | | | |
|---|---|---|---|---|---|---|---|---|---|
|  |  | No. 10 | No. 11 | No. 12 | No. 13 | No. 14 | No. 15 | No. 16 | No. 17 |
| $Al_2O_3$ clinker | | 82 | 82 | 82 | 77 | 84 | 87.7 | 86 | 82 |
| MgO | 3-1 mm | — | — | — | — | — | — | — | — |
|  | 200 mesh | 3 | 3 | 3 | 3 | 3 | 3 | 3 | 3 |
| carbon black | | 5 | 5 | 5 | 5 | 5 | 5 | 5 | 5 |
| pitch | | — | — | — | — | — | — | — | — |
| crystalline graphite | | — | — | — | — | — | — | — | — |
| SiC | | 5 | 5 | 5 | 11 | — | — | 2 | — |
| $B_4C$ | | 1 | 1 | 1 | — | 4 | 0.3 | — | 1 |
| metal Al | | — | — | — | — | — | — | — | 3 |
| metal Si | | — | — | — | — | — | — | — | 2 |
| condensate salt of formalin and aromatic sulfonate* | | 2 | — | 6 | 2 | 2 | 2 | 2 | 2 |
| **silica flour <5 μm | | 4 | 0.5 | 0.5 | 0.5 | 0.5 | 0.5 | 0.5 | 0.5 |
| >5 μm | | — | — | — | — | — | — | — | 0.5 |
| high-alumina cement | | 4 | 4 | 4 | 4 | 4 | 4 | 4 | 4 |
| ***content of added water wt. % | | 4.8 | 8.0 | 4.5 | 5.4 | 5.0 | 5.0 | 5.2 | 5.4 |

*, , *: These materials are added after the other materials are mixed with one another at a total amount of 100 wt %.

TABLE 4

|  |  | Embodiment | | | |
|---|---|---|---|---|---|
|  |  | No. 1 | No. 2 | No. 3 | No. 4 |
| after 24 hours at 110° C. | bulk density (specific gravity) | 2.90 | 2.90 | 2.86 | 2.92 |
|  | apparent porosity % | 15.0 | 14.7 | 16.2 | 15.5 |
|  | bending strength MPa | 9.5 | 10.1 | 12.4 | 12.0 |
| after 3 hours at 1500° C. | bulk density (specific gravity) | 2.84 | 2.84 | 2.80 | 2.85 |
|  | apparent porosity % | 16.2 | 16.0 | 16.7 | 16.0 |
|  | bending strength MPa | 13.8 | 14.9 | 19.5 | 18.9 |
| corrosion test, melting loss exponential | | 100 | 95 | 108 | 112 |
| spalling resistance | | ○ | ○ | ○ | ○ |

TABLE 5

| comparative example | after 24 hours at 110° C. | | | after 3 hours at 1500° C. | | | corrosion test, melting loss exponential | spalling resistance | note |
|---|---|---|---|---|---|---|---|---|---|
|  | bulk density (specific gravity) | apparent porosity % | bending strength MPa | bulk density (specific gravity) | apparent porosity % | bending strength MPa | | | |
| No. 1 | 2.80 | 15.1 | 9.0 | 2.70 | 16.2 | 5.1 | 160 | Δ | strength is lowered after heated |
| No. 2 | 2.95 | 14.9 | 9.8 | 2.90 | 14.9 | 4.3 | 175 | Δ | strength is lowered after heated |
| No. 3 | 2.90 | 14.5 | 12.5 | 2.70 | 17.5 | 5.2 | 90 | x | strength is lowered after heated |
| No. 4 | 2.28 | 23.1 | 3.2 | 2.20 | 25.0 | 2.0 | 360 | ○ | large porosity and large amount of working water |
| No. 5 | 2.69 | 20.5 | 5.8 | 2.50 | 22.1 | 5.4 | 200 | ○ | large porosity |
| No. 6 | 2.53 | 21.8 | 6.7 | 2.50 | 22.3 | 3.1 | 220 | ○ | large porosity |
| No. 7 | 3.05 | 14.3 | 10.1 | 3.04 | 14.9 | 17.4 | 160 | x | low resistance to spalling |
| No. 8 | — | — | — | — | — | — | — | — | occurence of crack when dried |
| No. 9 | — | — | — | — | — | — | — | — | occurence of crack when dried |

TABLE 6

| comparative example | after 24 hours at 110° C. ||| after 3 hours at 1500° C. ||| corrosion test, melting loss exponential | spalling resistance | note |
|---|---|---|---|---|---|---|---|---|---|
| | bulk density (specific gravity) | apparent porosity % | bending strength MPa | bulk density (specific gravity) | apparent porosity % | bending strength MPa | | | |
| No. 10 | 2.95 | 14.3 | 11.5 | 2.90 | 14.9 | 13.9 | 350 | Δ | large melting loss |
| No. 11 | — | — | — | — | — | — | — | — | occurrence of crack when dried |
| No. 12 | 2.55 | 20.5 | 4.8 | 2.50 | 22.1 | 5.4 | 250 | ○ | large porosity |
| No. 13 | 2.95 | 15.9 | 9.4 | 2.90 | 16.3 | 13.9 | 290 | Δ | large melting loss |
| No. 14 | 2.90 | 14.7 | 10.1 | 2.85 | 14.9 | 17.4 | 360 | Δ | large melting loss |
| No. 15 | 2.90 | 15.3 | 11.3 | 2.83 | 15.8 | 8.0 | 180 | Δ | low resistance to oxidation |
| No. 16 | 2.93 | 15.0 | 9.5 | 2.90 | 15.9 | 6.8 | 170 | Δ | low resistance to spalling |
| No. 17 | — | — | — | — | — | — | — | — | occurrence of crack when grown |

What is claimed is:

1. A castable refractory for a slide gate plate comprising (a) an alumina raw material, (b) 2 to 15 weight percent of an amorphous carbon raw material, (c) 0.5 to 10 weight percent of silicon carbide and/or boron carbide, (d) 2 to 10 weight percent magnesia having a particle size of 1 mm or less, (e) 0.2 to 3 weight percent fine silica powder having a particle size of 5 micrometers or less, and (f) 0.1 to 5 weight percent of a condensate salt of formalin and an aromatic sulfonate, wherein in part (c), the total amount of boron carbide is 3 weight percent or less and when the content of boron carbide is less than 0.5 weight percent, the amount of silicon carbide is 3 weight percent or more.

2. A castable refractory for a slide gate plate comprising (a) an alumina raw material, (b) 2 to 15 weight percent of an amorphous carbon raw material, (c) 3 to 10 weight percent of silicon carbide or 0.5 to 3 weight percent boron carbide, (d) 2 to 10 weight percent magnesia having a particle size of 1 mm or less, (e) 0.2 to 3 weight percent fine silica powder having a particle size of 5 micrometers or less, and (f) 0.1 to 5 weight percent of a condensate salt of formalin and an aromatic sulfonate.

3. The castable refractory as claimed in claim 1, wherein said amorphous carbon raw material is formed of carbon black.

4. The castable refractory as claimed in claim 1, wherein the magnesia is formed of sintered magnesia or electro-fused magnesia.

* * * * *